(12) United States Patent
Yamashita et al.

(10) Patent No.: US 7,614,216 B2
(45) Date of Patent: Nov. 10, 2009

(54) EXHAUST CLEANING-UP DEVICE FOR INTERNAL COMBUSTION ENGINE FOR VEHICLE

(75) Inventors: Masayuki Yamashita, Kyoto (JP); Katsuhiko Miyamoto, Kyoto (JP); Seiji Shiota, Kyoto (JP)

(73) Assignees: Mitsubishi Jidosha Kogyo Kabushiki Kaisha, Tokyo (JP); Mitsubishi Jidosha Engineering Kabushiki Kaisha, Aichi (JP)

( * ) Notice: Subject to any disclaimer, the term of this patent is extended or adjusted under 35 U.S.C. 154(b) by 299 days.

(21) Appl. No.: 11/629,500

(22) PCT Filed: Jun. 17, 2005

(86) PCT No.: PCT/JP2005/011132

§ 371 (c)(1),
(2), (4) Date: Dec. 14, 2006

(87) PCT Pub. No.: WO2005/124130

PCT Pub. Date: Dec. 29, 2005

(65) Prior Publication Data

US 2007/0180817 A1 Aug. 9, 2007

(30) Foreign Application Priority Data

Jun. 21, 2004 (JP) ............................... 2004-182812

(51) Int. Cl.
*F01N 3/00* (2006.01)

(52) U.S. Cl. .............................. 60/286; 60/284; 60/295; 60/297; 60/299

(58) Field of Classification Search .................. 60/284, 60/285, 286, 295, 297, 299
See application file for complete search history.

(56) References Cited

U.S. PATENT DOCUMENTS

| 5,479,898 A | 1/1996 | Cullen et al. |
| 6,253,547 B1 * | 7/2001 | Watanabe et al. ............. 60/297 |
| 6,357,225 B1 * | 3/2002 | Tanaka ........................ 60/277 |
| 6,622,478 B2 * | 9/2003 | Nakamura .................... 60/285 |
| 6,797,517 B1 * | 9/2004 | Hoshi et al. ................... 436/37 |

FOREIGN PATENT DOCUMENTS

| DE | 195 22 068 A1 | 1/1996 |
| DE | 699 03 873 T2 | 4/2003 |
| EP | 0945600 A1 | 9/1999 |
| JP | 2000-356155 A | 12/2000 |
| JP | 2001-098935 A | 4/2001 |
| JP | 2002-038927 A | 2/2002 |
| JP | 2003-343316 A | 12/2003 |
| JP | 2004-353516 A | 12/2004 |

* cited by examiner

*Primary Examiner*—Binh Q Tran
(74) *Attorney, Agent, or Firm*—Birch, Stewart, Kolasch and Birch, LLP (57) ABSTRACT

In an exhaust system, there are provided an HC absorbent which absorbs HC contained in exhaust when in a specified low-temperature range and desorbs the absorbed HC when it exceeds said low-temperature range, and a catalyst capable of at least removing HC by oxidation, where the catalyst is arranged at the same position as or downstream of the HC absorbent. When it is found that the HC absorbent is in a state ready for desorbing the absorbed HC (S16, S18) and the internal combustion engine is in a specified decelerating state (S14), fuel supply to some of the cylinders of an internal combustion engine is stopped while fuel is supplied to the other cylinders (partial fuel cut) (S22).

14 Claims, 6 Drawing Sheets

EXHAUST CLEANING-UP DEVICE FOR INTERNAL COMBUSTION ENGINE FOR VEHICLE

BACKGROUND OF THE INVENTION

1. Field of the Invention

This invention relates to an exhaust cleaning-up device for an internal combustion engine for a vehicle, and particularly to a technique for improving the capacity to remove HC (carbon hydride) emitted when the internal combustion engine is cold.

2. Description of the Related Art

Generally, in an exhaust system of an engine (internal combustion engine), there is provided an exhaust cleaning-up device for removing harmful substances (HC, CO, NOx, etc.) from exhaust using, for example a three-way catalyst. The three-way catalyst, however, cannot fully act for this removal until it reaches its activation temperature. Even when the three-way catalyst is arranged near the engine body so that it becomes activated early, there is still a problem that HC which is emitted especially in large amounts when the engine is cold-started and cannot be removed satisfactorily.

In order to solve this problem, there has been proposed an HC absorption catalytic device in which an exhaust gas cleaning-up catalyst layer is provided on an HC absorbent layer effective for absorbing HC so that HC is absorbed into the HC absorbent layer and that HC desorbed when the HC absorbent layer reaches a certain temperature is removed by oxidation with oxygen trapped in the exhaust gas cleaning-up catalyst layer.

There is, however, a problem that while the desorption of HC from the HC absorbent starts at low temperatures about 100° C. to 150° C., the exhaust gas cleaning-up catalyst becomes activated generally at high temperatures about 250° C. to 350° C., so that until the exhaust gas cleaning-up catalyst becomes activated, HC desorbed is not removed but discharged.

Considering problems like this, there has been developed a device arranged such that when the exhaust gas cleaning-up catalyst in the HC absorption catalytic device is at low temperature, so that, for example the amount of oxygen trapped in the exhaust gas cleaning-up catalyst layer is small and the oxygen-holding state of the exhaust gas cleaning-up catalyst has not reached a specified satisfactory level yet, the amount of oxygen contained in the exhaust is increased by setting the engine air/fuel ratio to a lean air-fuel ratio or stopping fuel supply to the engine (fuel cut) (see Japanese Unexamined Patent Publication No. 2002-38927).

Meanwhile, in recent years, an increasing number of vehicles have an automatic transmission (A/T) coupled to an output shaft of the engine. Normally, the A/T includes a hydraulic coupling that can be switched between a direct connected state and a non-direct connected state by means of a lock-up clutch (direct-connecting clutch). In the case of the A/T having such lock-up clutch, putting the lock-up clutch into a connecting state is normally prohibited while the A/T is cold. The reason is that while the A/T is cold, the frictional property of oil (such as ATF) in the transmission is unstable, so that putting the lock-up clutch into the connecting state makes variable speed control unstable and causes oscillation of the vehicle body, etc. and therefore causes deterioration in feeling.

There is, however, another problem. The period in which the A/T is cold approximately corresponds to the period in which the engine is cold-started and still cold. Thus, when the engine is cold-started, the lock-up clutch of the A/T is in the non-connecting state and the hydraulic coupling by itself cannot transmit power of the wheels to the engine. Hence, if the fuel cut is performed when the engine is cold-started, the engine revolving speed reduces drastically simultaneously with the stop of fuel supply and reaches a fuel-return revolving speed in a moment, so that fuel injection resumes. Thus, the vehicle provided with an A/T having a hydraulic coupling has a problem that when the engine is cold-started, supply of oxygen to the exhaust system by fuel cut is virtually unperformable, so that HC desorbed from the HC absorbent cannot be oxidized satisfactorily.

There is also a problem that when the engine is instantly subjected to a fuel return due to a drastic reduction in engine revolving speed caused by the fuel cut as mentioned above, hunting of the engine output and engine revolving speed occurring, so that the vehicle drivability deteriorates.

Further, it is not desirable to perform fuel cut also when the vehicle is not decelerating. Specifically, if the fuel cut is performed when the vehicle is not decelerating, sufficient engine output cannot be obtained in the period in which fuel supply is stopped, so that the vehicle drivability deteriorates.

Further, when the engine air/fuel ratio is set to a lean air/fuel ratio, a trade-off comes into question. Specifically, while HC desorbed from the HC absorbent is relatively satisfactorily removed by oxidation, lean combustion tends to cause emission of a large amount of NOx.

SUMMARY OF THE INVENTION

The primary object of this invention is to provide an exhaust cleaning-up device for an internal combustion engine for a vehicle which can improve the capacity to remove HC, preventing deterioration in vehicle drivability, particularly when the internal combustion engine is cold.

In order to achieve this object, this invention provides an exhaust cleaning-up device for an internal combustion engine for a vehicle, the internal combustion engine having a plurality of cylinders, comprising: an HC absorbent provided in an exhaust system, having a property that it absorbs HC contained in exhaust when in a specified low-temperature range and desorbs the absorbed HC when it exceeds said specified low-temperature range; a catalyst provided in the exhaust system, at the same position as or upstream of said HC absorbent, capable of at least removing HC by oxidation; a desorbing-state detecting element for finding that the HC absorbent is in a state ready for desorbing the absorbed HC; a decelerating-state detecting element for finding that the internal combustion engine is in a specified decelerating state; a fuel supply element for supplying fuel to the internal combustion engine; and a control element arranged to control the operation of the fuel supply element to stop fuel supply to some (at least one but not all) of the cylinders of the internal combustion engine and supply fuel to the other cylinders, when it is found by means of the desorbing-state detecting element that the HC absorbent is in the state ready for desorbing the absorbed HC and it is found by means of the decelerating-state detecting element that the internal combustion engine is in the specified decelerating state.

HC that has been absorbed into the HC absorbent begins to be desorbed from the HC absorbent as the temperature of the HC absorbent rises due to exhaust heat. In the above arrangement, when the HC absorbent is in the state ready for desorbing the absorbed HC and the internal combustion engine, or in other words, the vehicle is in the decelerating state, fuel supply to some of the cylinders of the internal combustion engine is stopped while fuel supply to the other cylinders is continued (this is called partial fuel cut).

Thus, even when the catalyst arranged at the same position as or upstream of the HC absorbent in the exhaust system does not trap a sufficient amount of oxygen, by causing only air to be emitted from some of the cylinders of the internal combustion engine into the exhaust system, it can be arranged that HC desorbed is satisfactorily oxidized on the catalyst with oxygen in this air, i.e., excess oxygen. Meanwhile, since fuel supply is continued for the other cylinders, it is possible to stabilize the engine output and prevent deterioration in vehicle drivability.

In this case, desirably, the desorbing-state detecting element includes an HC-absorbent temperature detecting element for detecting the temperature of the HC absorbent, and determines that the HC absorbent is in the state ready for desorbing the absorbed HC when it is found by means of the HC-absorbent temperature detecting element that the temperature of the HC absorbent is within a specified range.

In this case, by determining whether or not the temperature of the HC absorbent is within the specified range, it can be easily found that the HC absorbent is in the state ready for desorbing the absorbed HC.

Alternatively, it can be arranged such that the desorbing-state detecting element includes a time measuring element for measuring the time that has elapsed after start of the internal combustion engine, and determines that the HC absorbent is in the state ready for desorbing the absorbed HC when it is found by means of the time measuring element that the time that has elapsed after the start is within a specified range.

In this case, by determining whether or not the time that has elapsed after the start of the internal combustion engine is within the specified range, it can be easily found that the HC absorbent is in the state ready for desorbing the absorbed HC.

Desirably, the exhaust cleaning-up device further comprises an engine temperature detecting element for detecting the temperature of the internal combustion engine, wherein the control element controls the operation of the fuel supply element to stop fuel supply to some of the cylinders of the internal combustion engine and supply fuel to the other cylinders, when it is found by means of the engine temperature detecting element that the internal combustion engine is in a specified cold state, it is found by means of the desorbing-state detecting element that the HC absorbent is in the state ready for desorbing the absorbed HC, and it is found by means of the decelerating-state detecting element that the internal combustion engine is in the specified decelerating state.

When the internal combustion engine is cold, a large amount of HC is emitted and absorbed into the HC absorbent. In the above case, if the HC absorbent is in the state ready for desorbing the absorbed HC and the internal combustion engine, or in other words, the vehicle is in the decelerating state, fuel supply to some of the cylinders of the internal combustion engine is stopped while fuel supply to the other cylinders is continued (partial fuel cut).

Thus, even when the catalyst arranged at the same position as or upstream of the HC absorbent in the exhaust system does not trap a sufficient amount of oxygen, by causing only air to be emitted from some of the cylinders of the internal combustion engine into the exhaust system, it can be arranged that the HC desorbed in large amounts is satisfactorily oxidized on the catalyst with oxygen in this air, i.e., excess oxygen, while deterioration in vehicle drivability is prevented.

Desirably, the control element supplies fuel such that the air/fuel ratio in said other cylinders becomes a stoichiometric air/fuel ratio.

By this, it is possible to stabilize the engine output and prevent deterioration in vehicle drivability, and allow the HC desorbed from the HC absorbent to be satisfactorily oxidized on the catalyst while suppressing production of NOx satisfactorily.

Desirably, the exhaust cleaning-up device further comprises a throttle opening adjusting element for adjusting a throttle opening of the internal combustion engine, wherein the control element controls the operation of the throttle opening adjusting element to increase the throttle opening, when it is found by means of the desorbing-state detecting element that the HC absorbent is in the state ready for desorbing the absorbed HC and it is found by means of the decelerating-state detecting element that the internal combustion engine is in the specified decelerating state.

In this case, when the HC absorbent is in the state ready for desorbing the absorbed HC and the internal combustion engine, or in other words, the vehicle is in the decelerating state, fuel supply to some of the cylinders of the internal combustion engine is stopped while fuel supply to the other cylinders is continued (partial fuel cut), where the throttle opening is increased. By this, the amount of excess oxygen can be increased so that the HC desorbed can be satisfactorily oxidized on the catalyst.

Further, by increasing the fuel supply quantity with an increase in throttle opening, deterioration in vehicle drivability can be satisfactorily prevented at the same time.

Desirably, the control element controls the operation of the fuel supply element to stop fuel supply for all the cylinders of the internal combustion engine, when it is no longer found by means of the desorbing-state detecting element that the HC absorbent is in the state ready for desorbing the absorbed HC and it is found by means of the decelerating-state detecting element that the internal combustion engine is in the specified decelerating state.

In this case, when the HC absorbent is no longer in the state ready for desorbing the absorbed HC, unnecessary fuel supply can be suppressed to prevent deterioration in fuel economy.

Desirably, the control element controls the operation of the fuel supply element to continue fuel supply to all the cylinders of the internal combustion engine, before it is found by means of the desorbing-state detecting element that the HC absorbent is in the state ready for desorbing the absorbed HC, even when it is found by means of the decelerating-state detecting element that the internal combustion engine is in the specified decelerating state.

By this, it is possible to prevent the HC absorbent from suffering a drop in temperature before reaching the state ready for desorbing the absorbed HC and also prevent deterioration in drivability.

Desirably, an automatic transmission for variably transmitting drive power of the internal combustion engine to wheels is coupled to an output shaft of the internal combustion engine by means of a hydraulic coupling arranged to be switched between a direct-connected state and a non-direct-connected state by a direct-connecting clutch, the exhaust cleaning-up device further comprises a clutch control element for putting the direct-connecting clutch in a non-connecting state at least when the automatic transmission is in a specified low-temperature range, and a clutch-state detecting element for detecting the non-connecting state of the direct-connecting clutch, and the control element controls the operation of the fuel supply element to stop fuel supply to some of the cylinders of the internal combustion engine and supply fuel to the other cylinders, when the non-connecting state of the direct-connecting clutch is detected by the clutch-state detecting element.

In the case where an automatic transmission for variably transmitting drive power of the internal combustion engine to wheels is coupled to an output shaft of the internal combustion engine by means of a hydraulic coupling arranged to be switched between a direct-connected state and a non-direct-connected state by a direct-connecting clutch, when the automatic transmission is in a specified low-temperature range, if the direct-connecting clutch is in the connecting state, variable speed control is unstable, which causes oscillation of the vehicle body, etc. and therefore causes deterioration in feeling. Hence, normally, the direct-connecting clutch is put in the non-connecting state. In the above case, when the direct-connecting clutch is in the non-connecting state like this, partial fuel cut is performed.

By this, it is possible to supply a sufficient amount of excess oxygen to the exhaust system to allow the HC desorbed from the HC absorbent to be satisfactorily oxidized on the catalyst, and at the same time prevent a drastic reduction in the revolving speed of the internal combustion engine which tends to happen when the direct-connecting clutch is in the non-connecting state. Thus, hunting of the engine output and engine revolving speed, which is caused by an instant fuel return that tends to happen when fuel cut is performed for all the cylinders with the direct-connecting clutch put in the non-connecting state, can be suppressed and deterioration in vehicle drivability can be prevented more satisfactorily.

Meanwhile, when the direct-connecting clutch is in the connecting state, the internal combustion engine revolves by power from the wheels. Hence, in place of partial fuel cut, fuel cut can be performed for all the cylinders to prevent deterioration in fuel economy.

DETAILED DESCRIPTION OF THE INVENTION

BEST MODE OF CARRYING OUT THE INVENTION

On the basis of the drawings attached, embodiments of this invention will be described below.

Figure 1:
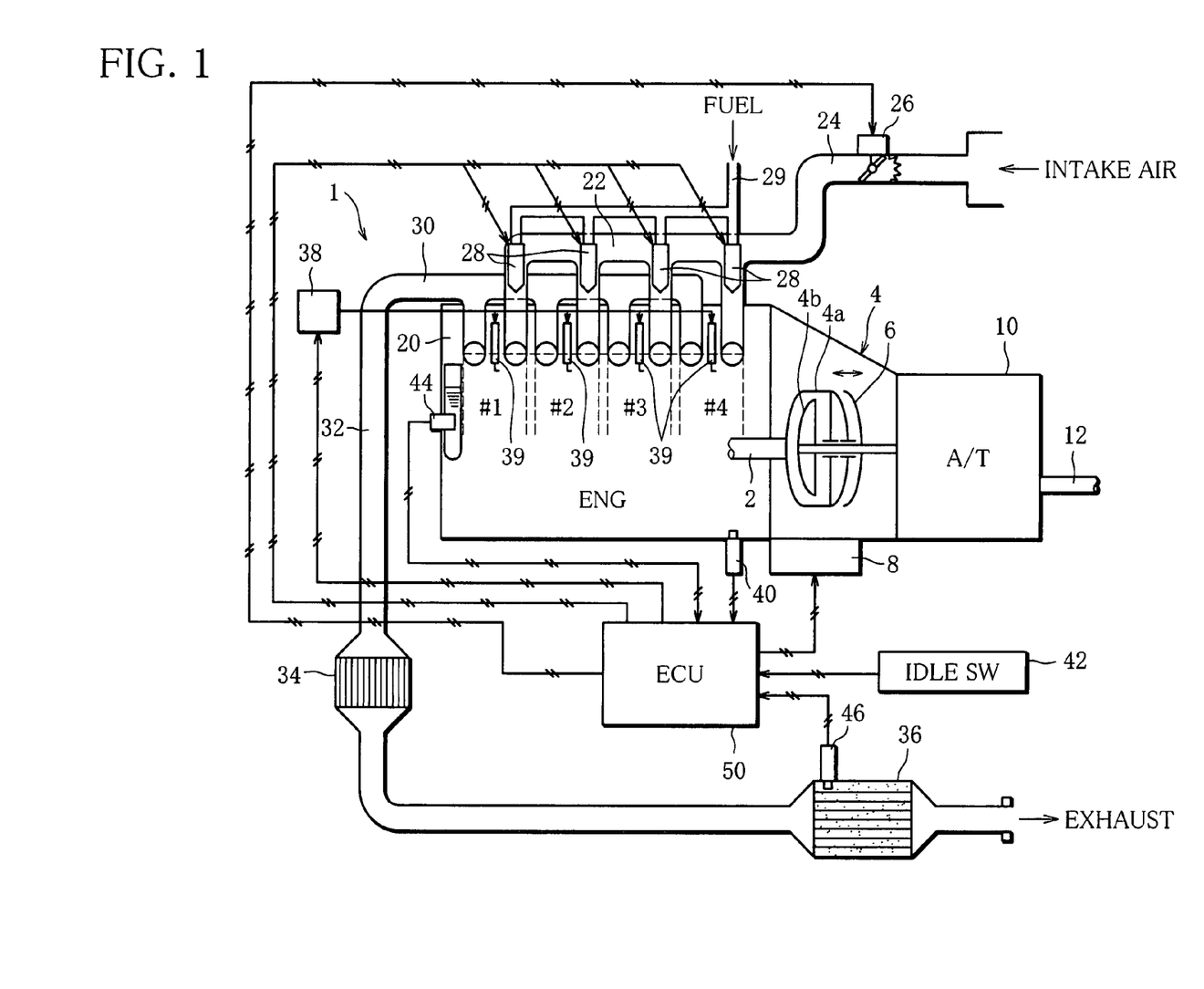
[FIG. 1] A diagram schematically showing the structure of an exhaust cleaning-up device for an internal combustion engine according to this invention, installed in a vehicle.

FIG. 1 schematically shows the structure of an exhaust cleaning-up device for an internal combustion engine according to this invention, installed in a vehicle. On the basis of this drawing, the structure of the exhaust cleaning-up device will be described below.

To a drive shaft 2 of an engine (internal combustion engine) 1, an automatic transmission (A/T) 10 is coupled by means of a hydraulic coupling 4. To the A/T 10, wheels forming a pair are connected by means of a differential gear unit and an axle (not shown). The A/T 10 can be replaced with a continuously variable transmission (CVT).

For the engine 1, for example a manifold-injection four-cylinder gasoline engine is adopted. To a cylinder head 20 of the engine 1, an intake manifold 22 is connected such that the branch passages of the intake manifold are connected with the intake ports of the cylinders (#1, #2, #3, #4), respectively. To the intake manifold 22, an intake pipe 24 is connected. In the intake pipe 24, a throttle valve 26 for adjusting the intake air quantity is provided.

In each branch passage of the intake manifold 22, an electromagnetic fuel injection valve (fuel supply element) 28 is provided. The fuel injection valve 28 is connected to a fuel supply unit (not shown) by a fuel pipe 29, and fuel is supplied through the fuel pipe 29.

To the cylinder head 20, also an exhaust manifold 30 is connected such that the branch passages of the exhaust manifold are connected with the exhaust ports of the cylinders (#1, #2, #3, #4), respectively. To the exhaust manifold 30, an exhaust pipe 32 is connected.

To the cylinder head 20, also spark plugs 39 are fitted to face the combustion chambers of the cylinders, respectively. Each spark plug 39 is connected to a battery (not shown) with an ignition coil 38 inserted between.

It is to be noted that to the cylinder head 20, intake valves for connecting and disconnecting the combustion chamber and the intake port and exhaust valves for connecting and disconnecting the combustion chamber and the exhaust port are fitted together with valve operating mechanisms, of which the description will be omitted here.

In the exhaust pipe 32, a three-way catalyst 34 is arranged at a location near the engine 1 so that it becomes activated early, and an HC trap catalyst 36 is arranged downstream of the three-way catalyst 34.

The three-way catalyst 34 contains a noble metal such as platinum (Pt). In an activated state in which the catalyst temperature is a specified temperature (about 250° C. to 350° C.) or higher, the three-way catalyst can trap a sufficient amount of oxygen around the noble metal when the exhaust air/fuel ratio is close to a stoichiometric air/fuel ratio and remove HC and CO by oxidation and also remove NOx satisfactorily by reduction.

The HC trap catalyst 36 contains an HC absorbent which contains, as a major constituent, a zeolite (β type zeolite or the like), for example. The HC trap catalyst 36 has a property that it absorbs HC contained in exhaust when in a specified low-temperature range (lower than 100° C., for example), and desorbs the absorbed HC when the catalyst temperature rises to a specified temperature (100° C. to 150° C., for example) or higher. Thus, the HC trap catalyst 36 has a role of absorbing HC contained in exhaust and thereby reducing the amount of HC discharged into the atmosphere when the engine 1 is cold so that the amount of HC emitted from the engine is large and the three-way catalyst 34 is not activated yet.

Like the three-way catalyst 34, the HC trap catalyst 36 also contains a noble metal such as platinum (Pt), so that it has a three-way catalytic function (oxidation catalytic function, reduction catalytic function) in addition to the HC absorbing function. In an activated state at a specified temperature (about 250° C. to 350° C.) or higher, the HC trap catalyst can trap a sufficient amount of oxygen around the noble metal and remove HC and CO as well as NOx, satisfactorily. Even when the HC trap catalyst 36 is not activated yet and therefore does not trap a sufficient amount of oxygen around the noble metal, it can show the oxidation catalytic function in an oxygen-excess atmosphere and therefore can remove HC and CO by oxidation relatively well.

The hydraulic coupling 4 is known as a torque converter, and includes a pump 4a, a turbine 4b and a stator (not shown). The hydraulic coupling 4 also includes a lock-up clutch (direct-connecting clutch) 6 for connecting and disconnecting the pump 4a and the turbine 4b, and a hydraulic unit 8 for performing connection/disconnection control on the lock-up clutch 6. By this, switch between a direct-connected state (locked-up state) and a non-direct-connected state (slipping state, disconnected state) can be effected depending on the operating state of the vehicle or engine 1.

The engine 1 is provided with a crank angle sensor 40 for monitoring the revolution of a crank shaft and detecting the crank angle. By means of the crank angle sensor 40, the engine revolving speed Ne is detected.

The engine 1 is also provided with an idle switch (idle SW) (decelerating-state detecting element) 42 for detecting idling of the engine 1, and a water temperature sensor (engine temperature detecting element) 44 for detecting the coolant temperature, namely the engine water temperature and thereby detecting the warmed state of the engine 1.

For the HC trap catalyst 36, a temperature sensor (HC-absorbent temperature detecting element) 46 for detecting the HC trap temperature, namely the temperature of the HC trap catalyst 36 is provided.

An electronic control unit (ECU) 50 is a master control unit which comprises a central processing unit (CPU), a timer (time measuring element), etc. and which controls various controls on the vehicle including controls on the engine 1. To the input of the ECU, the above-mentioned crank angle sensor 40, idle SW 42, water temperature sensor 44 and temperature sensor 46, and other various sensors are connected.

Meanwhile, to the output of the ECU 50, the above-mentioned hydraulic unit 8, throttle valve 26, fuel injection valves 28 and spark coils 38, and other various devices are connected, and the operation of these devices is controlled on the basis of input information from the various sensors mentioned above. It is to be noted that the connecting/non-connecting state of the lock-up clutch 6 can be easily detected from a control instruction given to the hydraulic unit 8 (clutch-state detecting element).

The engine 1 is arranged such that on the basis of information from the ECU 50, so-called fuel cut control, namely temporary stop of fuel supply from the fuel injection valve 28 (cylinder rest) can be performed. In particular, in the case of the exhaust cleaning-up device for the internal combustion engine for the vehicle according to the present invention, the engine 1 is arranged such that fuel cut for bringing all the cylinders to rest (all-cylinder fuel cut) and fuel cut for bringing only some (at least one but not all) of the cylinders to rest while supplying fuel to the other cylinders so as to remove by oxidation the HC which is desorbed from the HC trap catalyst 36 as the temperature of the HC trap catalyst 36 rises (hereinafter referred to as "partial fuel cut") can be performed (control element).

Next, the fuel cut control in the exhaust cleaning-up device for the internal combustion engine for the vehicle according to the present invention, arranged as described above, will be described.

First Embodiment

First, a first embodiment will be described.

Figure 2:
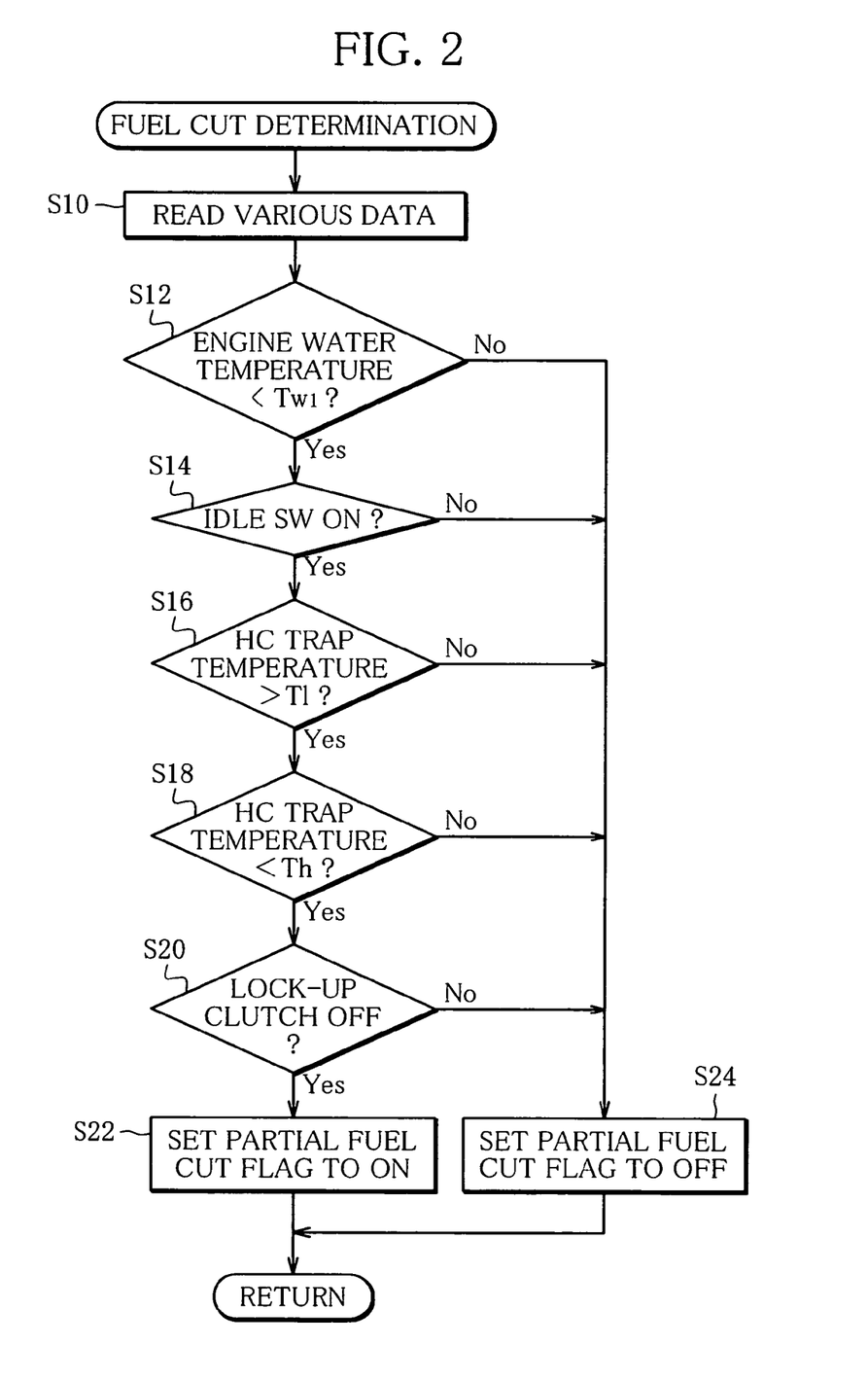
[FIG. 2] A flow chart showing a fuel cut determination routine in a first embodiment of this invention.
Figure 3:
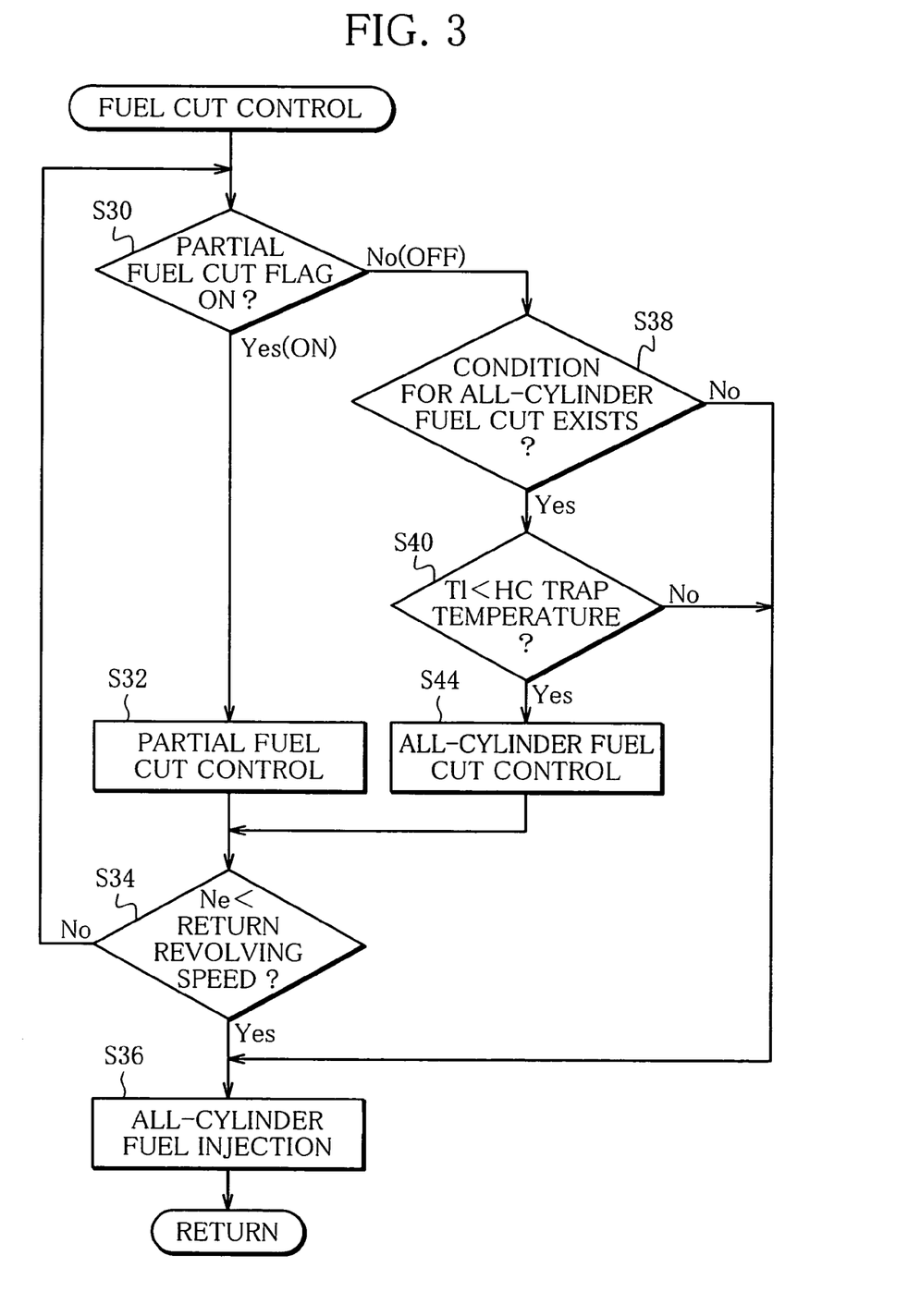
[FIG. 3] A flow chart showing a fuel cut control routine in the first embodiment of this invention.

FIG. 2 shows, in the form of a flow chart, a fuel cut determination routine executed by the ECU 40 in the first embodiment, and FIG. 3 shows, in the form of a flow chart, a fuel cut control routine in the first embodiment. The description below will be made following these flow charts.

Here, first, according to the fuel cut determination routine shown in FIG. 2, which of the all-cylinder fuel cut and the partial fuel cut for HC removal should be performed is determined.

In step S10, for fuel cut determination, various data is read from various sensors.

In step S12, whether or not the engine water temperature is lower than a specified temperature Tw1 is determined from coolant temperature information from the water temperature sensor 44. If the result of the determination is No, i.e., it is determined that the engine water temperature is the specified temperature Tw1 or higher and therefore the engine 1 is warm, step S24 is taken, i.e., a partial fuel cut flag is set to OFF. Specifically, when the engine 1 is warm, it can be determined that the amount of HC emitted is smaller than when the engine 1 is cold, and that the three-way catalyst 34 and the HC trap catalyst 36 are activated due to exhaust heat. Hence, the partial fuel cut flag is set to OFF so as not to perform the partial fuel cut.

Meanwhile, if the result of the determination in step S12 is Yes, i.e., it is determined that the engine water temperature is lower than the specified temperature Tw1 and therefore the engine 1 is cold (in a specified cold state), it can be determined that the amount of HC emitted is large and therefore a large amount of HC is absorbed into the HC trap catalyst 36, and that the possibility that the absorbed HC is desorbed from the HC trap catalyst 36 as the temperature of the HC trap catalyst 36 rises is high. Hence, step S14 is taken.

In step S14, whether or not the idle SW 42 is ON and the engine 1 is idling is determined. Specifically, not only whether or not the vehicle is stopped and the engine 1 is idling, but also whether or not the vehicle is decelerating and the engine 1 is idling is determined. If the result of the determination is No, step S24 is taken. Meanwhile, if the result of the determination is Yes, i.e., it is determined that the idle SW 42 is ON and the vehicle is decelerating and therefore engine output is not particularly required and the performing of partial fuel cut does not cause problems, step S16 is taken.

In step S16, whether or not the temperature of the HC trap catalyst 36 is higher than a specified low temperature T1 (100° C., for example) at which HC starts being desorbed from the HC trap catalyst 36 is determined from information from the temperature sensor 46 (desorbing-state detecting element). If the result of the determination is No, i.e., it is determined that the temperature of the HC trap catalyst 36 is still the specified low temperature T1 or lower, step S24 is taken, because partial fuel cut is not required since HC is satisfactorily absorbed into the HC trap catalyst 36 and not desorbed from the HC trap catalyst 36. Meanwhile, if the result of the determination is Yes, i.e., it is determined that the temperature of the HC trap catalyst 36 is higher than the specified low temperature T1, step S18 is taken.

In step S18, in a manner similar to the above, whether or not the temperature of the HC trap catalyst 36 is lower than a specified high temperature Th (T1+200° C., for example) at which HC stops being desorbed from the HC trap catalyst 36 is determined (desorbing-state detecting element). If the result of the determination is No, i.e., it is determined that the temperature of the HC trap catalyst 36 is the specified high temperature Th or higher, step S24 is taken to prevent the partial fuel cut from being unnecessarily performed. Meanwhile, if the result of the determination is Yes, i.e., it is determined that the temperature of the HC trap catalyst 36 is lower than the specified high temperature Th, step S20 is taken.

By performing the determination in step S16 and step S18 like this, it is possible to perform the partial fuel cut easily and efficiently in the period in which the temperature of the HC trap catalyst 36 is between the specified low temperature T1 and the specified high temperature Th (within a specified range), namely in the period in which HC is being desorbed from the HC trap catalyst 36.

In step S20, whether or not the lock-up clutch 6 is OFF, namely in the non-connecting state is determined.

When the engine 1 is cold, normally the A/T 10 is likewise cold and therefore the temperature of an automatic transmission fluid (ATF) is low. In this situation, if the lock-up clutch 6 is brought into the connecting state, speed change control becomes unstable, which tends to cause oscillation of the vehicle body, etc. and therefore cause deterioration in feeling. Hence, normally, when the temperature of the automatic transmission fluid is in a specified low-temperature range (25° C. or lower, for example), the lock-up clutch 6 is put in the non-connecting state. Thus, in this step S20, whether or not the A/T 10 is cold and the lock-up clutch 6 is in the non-connecting state is determined.

If the result of the determination in step S20 is No, i.e., the lock-up clutch 6 is in the connecting state, power from the wheels rotates the engine 1, and therefore, even if all-cylinder fuel cut is performed in the engine 1, it does not cause a drastic reduction in engine revolving speed Ne. In other words, when the lock-up clutch 6 is in the connecting state, it is not necessary to perform partial fuel cut to ensure the engine revolution by injecting fuel into some of the cylinders. Thus, also in this case, in order to prevent the partial fuel cut from being unnecessarily performed, step 24 is taken. Meanwhile, if the result of the determination in step S20 is Yes, i.e., it is determined that the lock-up clutch 6 is in the non-connecting state, step S22 is taken.

In step S22, the partial fuel cut flag is set to ON. Specifically, if the engine water temperature is lower than the specified temperature Tw1, the idle SW is ON and the vehicle is decelerating, the temperature of the HC trap catalyst 36 is between the specified low temperature T1 and the specified high temperature Th, and the lock-up clutch 6 is in the non-connecting state, then the partial fuel cut flag is set to ON to allow the partial fuel cut to be performed.

Subsequent to the fuel cut determination described above, the fuel cut control routine shown in FIG. 3 is executed.

In step S30, whether or not the partial fuel cut flag, which is set in the above-described fuel cut determination process, is ON is determined. If the result of the determination is Yes, i.e., the partial fuel cut flag is ON, step S32 is taken, i.e., the partial fuel cut control is performed.

Here, for example, fuel supply is stopped for two (#1 and #4 cylinders, for example) of the four cylinders, while fuel supply is performed for the other two cylinders (#2 and #3 cylinders, for example) in the normal manner. In this case, fuel injection to the two cylinders for which fuel supply is to be performed is performed such that the air/fuel ratio becomes a stoichiometric air/fuel ratio. If the engine 1 is a V-type engine in which an exhaust passage with an air/fuel ratio sensor is provided for each bank, stoichiometric feedback control can be performed by stopping fuel injection for one of the two banks while performing fuel supply for the other bank. It is to be noted that in the partial fuel cut control, the air/fuel ratio is open-loop-controlled.

For example, if the all-cylinder fuel cut is performed when the lock-up clutch 6 is in the non-connecting state, the engine revolving speed Ne reduces drastically and reaches a fuel-return revolving speed in a moment, so that the fuel injection resumes. This produces a problem that supply of oxygen to the exhaust system by fuel cut can virtually not be performed, so that HC desorbed from the HC absorbent cannot be oxidized satisfactorily. In contrast, when the partial fuel cut control is performed as described above, reduction in engine revolving speed Ne is prevented, air is satisfactorily emitted from some of the cylinders into the exhaust system, and therefore HC desorbed from the HC absorbent can be satisfactorily oxidized with excess oxygen contained in this air under the oxidation catalytic function of the HC trap catalyst 36.

Further, if the fuel cut causes a drastic reduction in engine revolving speed Ne and therefore leads to an immediate fuel return, it causes a problem that hunting of the engine output and engine revolving speed Ne occurs, so that the vehicle drivability deteriorates. When the partial fuel cut control is performed as described above, such hunting of the engine output and engine revolving speed Ne does not occur, and therefore deterioration in vehicle drivability is prevented.

Further, by performing fuel injection such that the air/fuel ratio in the two cylinders for which fuel supply is to be performed becomes a stoichiometric air/fuel ratio, it is possible to stabilize combustion and prevent deterioration in vehicle drivability more satisfactorily.

Further, by performing fuel injection such that the air/fuel ratio becomes a stoichiometric air/fuel ratio, the production of NOx by combustion is suppressed. Thus, in the partial fuel cut control in the present invention, HC desorbed from the HC absorbent can be oxidized satisfactorily, and at the same time the production of NOx can be suppressed satisfactorily.

It is to be noted that in the partial fuel cut control, engine torque decreases compared with normal operation in which fuel supply is performed for all the cylinders. If, however, an increase in engine torque is required, it can be achieved by adjusting the opening of the throttle valve 26 (throttle opening) to be greater and adjusting the fuel supply quantity correspondingly, thus maintaining the stoichiometric air/fuel, without causing reduction in engine revolving speed Ne or deterioration in vehicle drivability.

Further, by increasing the opening of the throttle valve 26 like this, the amount of air emitted from some of the cylinders and therefore the amount of excess oxygen can be increased. Consequently, HC desorbed from the HC absorbent can be oxidized more satisfactorily.

In step S34, whether or not the engine revolving speed Ne is lower than the fuel-return revolving speed is determined. Here, the fuel-return revolving speed is set depending on the engine water temperature, such that the fuel-return revolving speed is higher when the engine water temperature is lower. When the partial fuel cut control is being performed, stable combustion is taking place in two of the cylinders, and therefore, normally, the engine revolving speed Ne does not become lower than the fuel-return revolving speed. The result of the determination is therefore No, and the partial fuel cut control is continued. Meanwhile, when the result of the determination is Yes, i.e., the engine revolving speed Ne is lower than the fuel-return revolving speed, step S36 is taken, i.e., normal operation is performed by performing fuel injection for all the cylinders.

Meanwhile, if the result of the determination in step S30 is No, i.e., the partial fuel cut flag is OFF, step S38 is taken.

In step S38, whether or not the condition for performing all-cylinder fuel cut exists is determined. As the condition for performing all-cylinder fuel cut, the condition that the idle SW is ON and the vehicle is decelerating is applied, for example. Thus, if, for example, the idle SW is OFF, the result of the determination here is No, so that step S36 is taken, i.e., normal operation is performed by performing fuel injection for all the cylinders. If the partial fuel cut flag is OFF but, for example, the idle SW is ON, the result of the determination is Yes, so that step S40 is taken.

In step S40, whether or not the partial fuel cut flag is OFF but the result of the determination in step S16 above is Yes, i.e., the temperature of the HC trap catalyst 36 is higher than the specified low temperature T1 is determined. If the result of the determination is Yes, since the condition for performing the all-cylinder fuel cut exists, step S44 is taken, i.e., the all-cylinder fuel cut is performed. The all-cylinder fuel cut is continued as long as it is not determined in step S34 that the engine revolving speed Ne is lower than the fuel-return revolving speed.

Suppose that, in the above fuel cut determination routine, the result of the determination in step S20 is No, i.e., the lock-up clutch 6 is in the connecting state, so that the partial fuel cut flag is set to Off. In this case, since the condition that the idle SW is ON is satisfied and also the condition in step S40 is satisfied, the all-cylinder fuel cut is performed. In this case, as mentioned above, power from the wheels rotates the engine 1, and therefore, even when the all-cylinder fuel cut is performed in the engine 1, a drastic reduction in engine revolving speed Ne does not happen. Thus, unnecessary fuel supply can be suppressed and deterioration in fuel economy can be prevented.

Meanwhile, if the result of the determination is No, i.e., it is determined that the temperature of the HC trap catalyst 36 is the specified low temperature T1 or lower, it means that the HC trap catalyst 36 has not reached a desorption temperature yet. Hence, although the condition for performing the all-cylinder fuel cut exits, step S36 is taken, i.e., fuel injection is performed for all the cylinders. By this, a drop in temperature of the HC trap catalyst 36 can be prevented.

Figure 6:
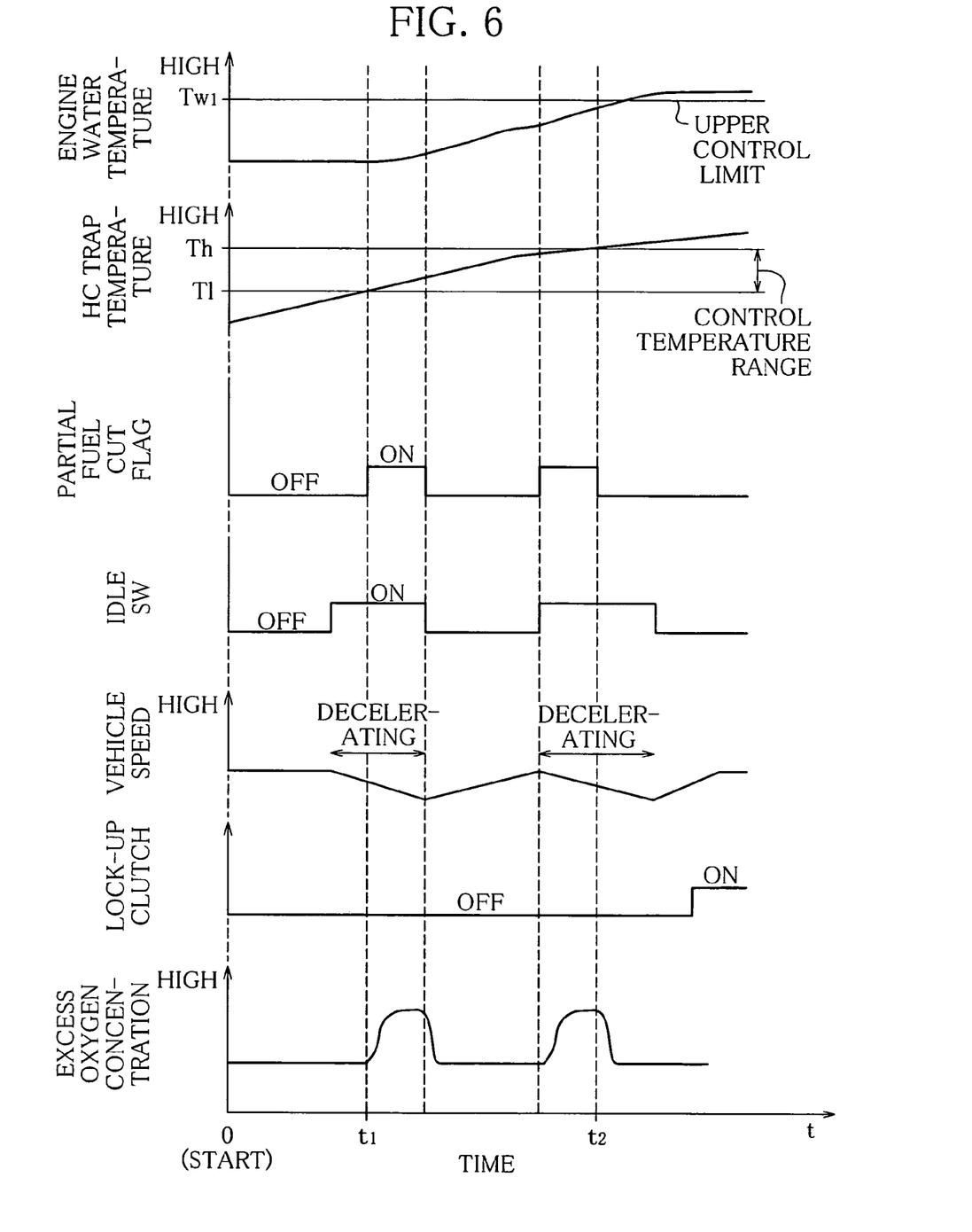
[FIG. 6] A time chart showing an example of result of fuel cut control.

FIG. 6 shows an example of result of the above-described fuel cut control in the form of a time chart. As this diagram shows, if the engine water temperature is lower than the specified temperature TW1, the idle SW is ON and the vehicle is decelerating, the temperature of the HC trap catalyst 36 is between the specified low temperature T1 and the specified high temperature Th, and the lock-up clutch 6 is in the non-connecting state, then the partial fuel cut is performed, so that a sufficient amount of excess oxygen is provided to the exhaust system. Consequently, HC desorbed from the HC absorbent is satisfactorily removed by oxidation under the oxidation catalytic function of the HC trap catalyst 36, while deterioration in vehicle drivability is prevented.

Second Embodiment

Next, a second embodiment will be described.

Figure 4:
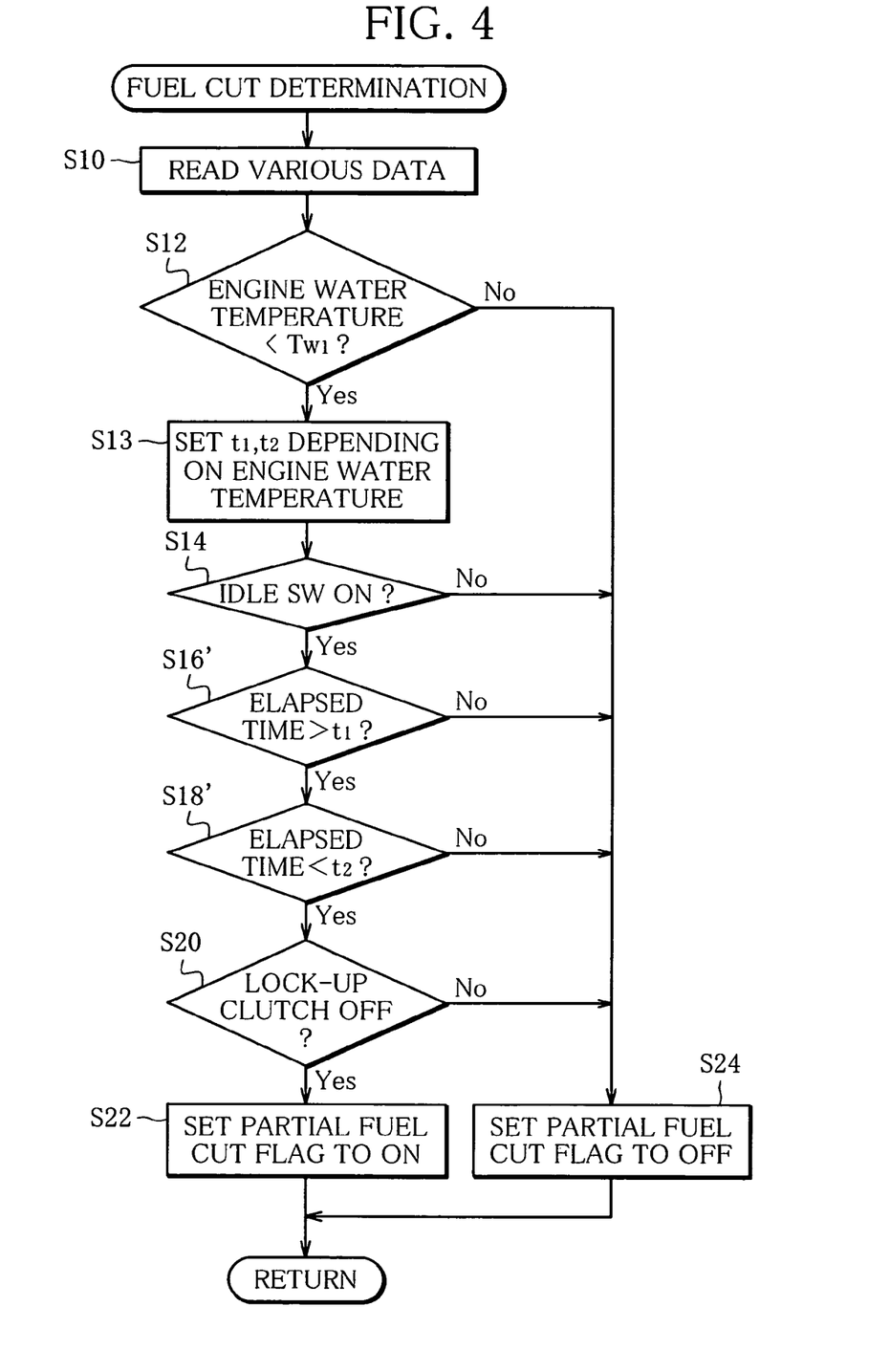
[FIG. 4] A flow chart showing a fuel cut determination routine in a second embodiment of this invention.
Figure 5:
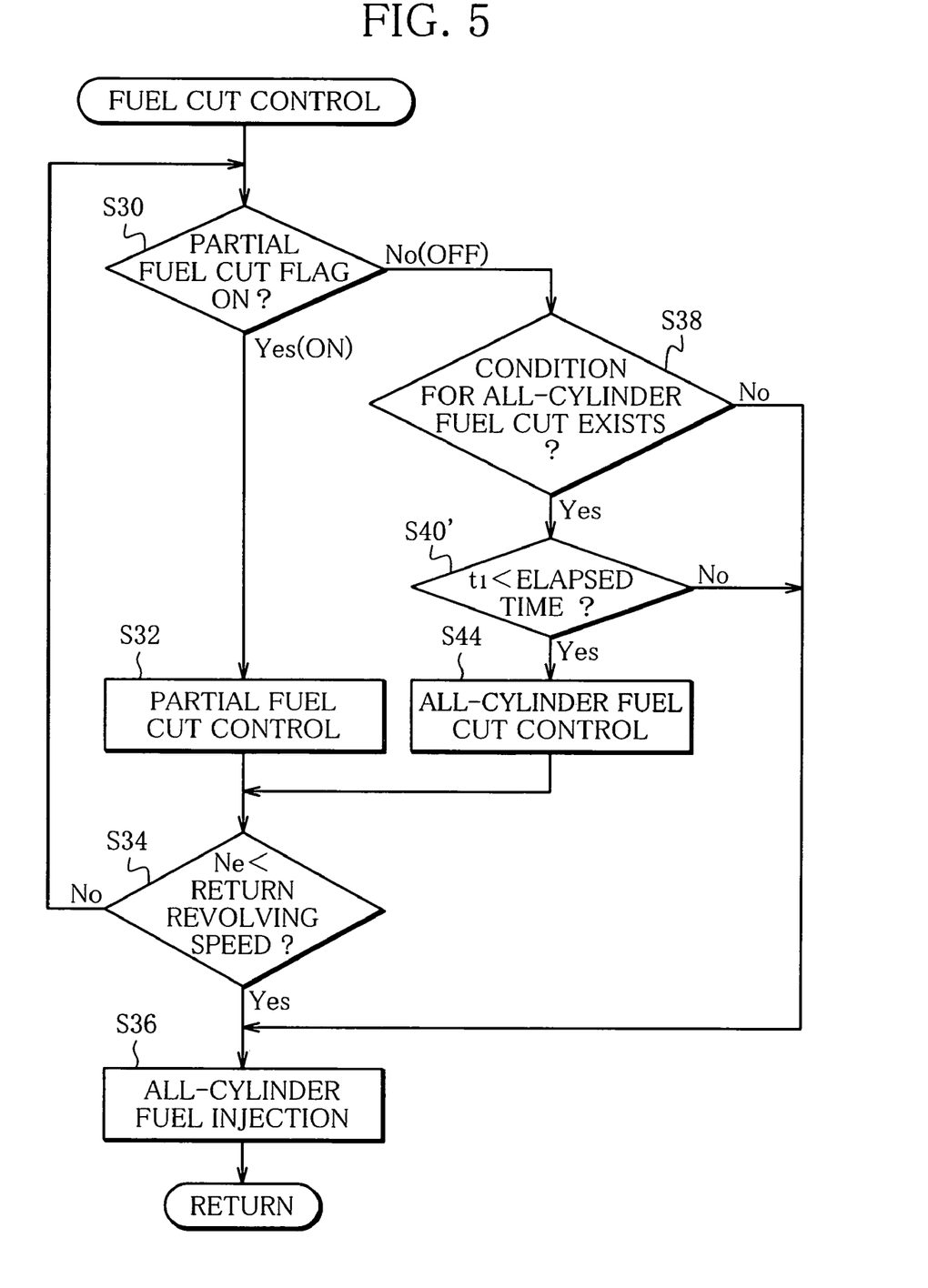
[FIG. 5] A flow chart showing a fuel cut control routine in the second embodiment of this invention.

FIG. 4 shows, in the form of a flow chart, a fuel cut determination routine executed by the ECU 40 in the second embodiment, and FIG. 5 shows, in the form of a flow chart, a fuel cut control routine in the second embodiment. The description below will be made following these flow charts. It is to be noted that the second embodiment differs from the first embodiment in that the period in which HC is being desorbed from the HC trap catalyst 36 is determined not from the temperature of the HC trap catalyst 36 but from the time that has elapsed after the engine 1 was started. In the following, differences from the first embodiment will be described mainly, while the steps in common with the first embodiment will be referred to by the same step numbers and described in brief.

After step S10 in FIG. 4, if the result of the determination in step S12 is Yes, i.e., it is determined that the engine water temperature is lower than the specified temperature Tw1 and the engine 1 is cold (in a specified cold state), step S13 is taken.

In step S13, specified after-start-of-engine-1 elapsed times t1 and t2 (t1<t2) corresponding to the period in which HC is being desorbed from the HC trap catalyst 36 are set depending on the engine water temperature. It is to be noted that the relation between the engine water temperature and the after-start elapsed times t1 and t2 is obtained in advance from an experiment or the like, in the form of a map. Hence, actually, specified after-start elapsed times t1 and t2 corresponding to a specified engine water temperature are read from this map.

If the result of the determination in step S14 is Yes, i.e., the idle SW 42 is ON, step S16' is taken.

In step S16', whether or not the time that has elapsed after the start of the engine 1, measured by the timer of the ECU 50, is greater than the specified after-start elapsed time t1 is determined (desorbing-state detecting element). If the result of the determination is No., i.e., it is determined that the time that has elapsed after the start is still the specified after-start elapsed time t1 or less, it can be determined that HC can be satisfactorily absorbed into the HC trap catalyst 36 and is not desorbed from the HC trap catalyst 36 and therefore the partial fuel cut is not required. Thus, step S24 is taken, i.e., the partial fuel cut flag is set to OFF. Meanwhile, if the result of the determination is Yes, i.e., it is determined that the time that has elapsed after the start is greater than the specified after-start elapsed time t1, step S18' is taken.

In step S18', in a manner similar to the above, whether or not the time that has elapsed after the start of the engine 1 is less than the specified after-start elapsed time t2 is determined (desorbing-state detecting element). If the result of the determination is No., i.e., it is determined that the time that has elapsed after the start is the specified after-start elapsed time t2 or greater, step S24 is taken to prevent the partial fuel cut from being unnecessarily performed. If the result of the determination is Yes, i.e., it is determined that the time that has elapsed after the start is less than the specified after-start elapsed time t2, step S20 is taken.

By performing the determination in step S16' and step S18' this way, it is possible to perform the partial fuel cut easily and efficiently in the period in which the time that has elapsed after the start of the engine 1 is between the specified after-start elapsed time t1 and the specified after-start elapsed time t2 (in a specified range), i.e., in the period in which HC is being desorbed from the HC trap catalyst 36.

In step S20, whether or not the lock-up clutch is OFF, namely in the non-connecting state is determined. If the result of the determination is No, i.e., the lock-up clutch 6 is in the connecting state, step S24 is taken to prevent the partial fuel cut from being unnecessarily performed. If the result of the determination in step S20 is Yes, i.e., it is determined that the lock-up clutch 6 is in the non-connecting state, step S22 is taken in order to perform the partial fuel cut, specifically, the partial fuel cut flag is set to ON.

In step S30 in FIG. 5, whether or not the partial fuel cut flag, which is set in the above-described fuel cut determination process, is ON is determined. If the result of the determination is Yes, i.e., the partial fuel cut flag is ON, step S32 is taken, i.e., the partial fuel cut control is performed.

By this, like the above case, reduction in engine revolving speed Ne is prevented and air is emitted from some of the cylinders into the exhaust system satisfactorily, so that HC desorbed from the HC absorbent can be oxidized with the excess oxygen contained in this air under the oxidation catalytic function of the HC trap catalyst 36 satisfactorily and at the same time hunting of the engine output and engine revolving speed Ne and therefore deterioration in vehicle drivability can be prevented.

Further, by performing fuel injection to the cylinders for which fuel supply is to be performed such that the air/fuel ratio becomes a stoichiometric air/fuel ratio, it is possible to stabilize combustion, prevent deterioration in vehicle drivability, and suppress the production of NOx by combustion.

Further, in the partial fuel cut control, by adjusting the opening of the throttle valve 26 (throttle opening) to be greater, the amount of air emitted from some of the cylinders and therefore the amount of excess oxygen can be increased. By adjusting the fuel supply quantity correspondingly, the engine torque can be increased, maintaining the stoichiometric air/fuel ratio, without causing deterioration in drivability.

In step S34, whether or not the engine revolving speed Ne is lower than the fuel-return revolving speed is determined. If the result of the determination is No, the partial fuel cut control is continued. If the result of the determination is Yes, step S36 is taken, i.e., normal operation is performed by performing fuel injection for all the cylinders.

Meanwhile, if the result of the determination in step S30 is No, i.e., the partial fuel cut flag is OFF, step S38 is taken, i.e., whether or not the condition for performing all-cylinder fuel cut exists is determined. If, for example, the idle SW is OFF, the result of the determination in step S38 is No, so that step S36 is taken, i.e., normal operation is performed by performing fuel injection for all the cylinders. If the partial fuel cut flag is OFF but, for example, the idle SW is ON, the result of the determination is Yes, so that step S40' is taken.

In step S40', whether or not the partial fuel cut flag is OFF but the result of the determination in step S16' above is Yes, i.e., the time that has elapsed after the start of the engine 1 is greater than the specified after-start elapsed time t1 is determined. If the result of the determination is Yes, since the condition for performing the all-cylinder fuel cut exists, step S44 is taken, i.e., the all-cylinder fuel cut is performed. By this, unnecessary fuel supply can be suppressed and deterioration in fuel economy can be prevented.

Meanwhile, if the result of the determination is No. i.e., it is determined that the time that has elapsed after the start is the specified after-start elapsed time t1 or less, it is inferred that the HC trap catalyst 36 has not reached the desorption temperature yet. Hence, even when the condition for performing the all-cylinder fuel cut exists, step S36 is taken, i.e., fuel injection is performed for all the cylinders. By this, a drop in temperature of the HC trap catalyst 36 can be prevented.

In FIG. 6, the specified after-start elapsed times t1 and t2 are indicated. As this diagram shows, if the engine water temperature is lower than the specified temperature Tw1, the idle SW is ON and the vehicle is decelerating, the time that has elapsed after the start of the engine 1 is between the specified after-start elapsed time t1 and the specified after-start elapsed time t2, and the lock-up clutch 6 is in the non-connecting state, then the partial fuel cut is performed, so that a sufficient amount of excess oxygen is provided to the exhaust system. Consequently, as in the case of the above-described first embodiment, HC desorbed from the HC absorbent is satisfactorily removed by oxidation under the oxidation catalytic function of the HC trap catalyst 36, while deterioration in vehicle drivability is prevented.

In the above, embodiments of the exhaust cleaning-up device for the internal combustion engine for the vehicle according to the present invention has been described. The present invention is, however, not limited to the described embodiments.

For example, in the described embodiments, it is arranged such that the partial fuel cut is performed on the condition that the engine water temperature is lower than the specified temperature Tw1 (step S12), the idle SW is ON and the vehicle is decelerating (step S14), the HC trap catalyst 36 is in the state ready for desorbing HC (steps S16 and S18 or steps S16' and S18'), and the lock-up clutch 6 is in the non-connecting state (step S20). The arrangement is, however, not limited to this. It can be arranged such that the partial fuel cut is performed on the condition that the idle SW is ON and the vehicle is decelerating (step S14), the HC trap catalyst 36 is in the state ready for desorbing HC (steps S16 and S18 or steps S16' and S18'), and the lock-up clutch 6 is in the non-connecting state (step S20), no matter whether the engine 1 is cold or not.

Alternatively, it can be arranged such that the partial fuel cut is performed on the condition that the engine water temperature is lower than the specified temperature Tw1 (step S12), the idle SW is ON and the vehicle is decelerating (step S14), and the HC trap catalyst 36 is in the state ready for desorbing HC 36 (steps S16 and S18 or steps S16' and S18'), no matter whether the lock-up clutch 6 is in the non-connecting state or not.

Alternatively, it can be arranged such that the partial fuel cut is performed simply on the condition that the idle SW is ON and the vehicle is decelerating (step S14), and the HC trap catalyst is in the state ready for desorbing HC (steps S16 and S18 or steps S16' and S18'), no matter whether the engine 1 is cold or not and whether the lock-up clutch 6 is in the non-connecting state or not.

Further, although, in the described embodiments, the engine 1 is a manifold-injection four-cylinder gasoline engine, the engine 1 may be any type as long as it has a plurality of cylinders and allows fuel cut to be performed for only some (at least one but not all) of the cylinders.

Further, in the described embodiments, it is arranged such that fuel cut is performed for half of the four cylinders, namely two cylinders while fuel is supplied to the other half, namely the other two cylinders. How many of the cylinders should be subjected to fuel cut and how many to fuel supply may, however, be determined appropriately as long as deterioration in vehicle drivability can be prevented and a sufficient amount of excess oxygen can be provided.

Further, although in the described embodiments, the three-way catalyst 34 is provided near the engine 1, the present invention is applicable to the case in which the three-way catalyst 34 is not provided.

Further, in the described embodiments, the HC trap catalyst 36 having also an oxidation catalytic function is used so that HC desorbed from the HC trap catalyst 36 can be removed by oxidation under this oxidation catalytic function. Instead of this, a separate three-way catalyst or oxidation catalyst may be provided downstream of an HC trap catalyst 36.

The invention claimed is:

1. An exhaust cleaning-up device for an internal combustion engine for a vehicle, the internal combustion engine having a plurality of cylinders, comprising:

an HC absorbent provided in an exhaust system, having a property of absorbing HC contained in exhaust when in a specified low-temperature range and desorbing the absorbed HC when exceeding said specified low-temperature range;

a catalyst provided in the exhaust system, at the same position as or downstream of said HC absorbent, capable of at least removing HC by oxidation;

a desorbing-state detecting element for finding that the HC absorbent is in a state ready for desorbing the absorbed HC;

a decelerating-state detecting element for finding that the internal combustion engine is in a specified decelerating state;

a fuel supply element for supplying fuel to the internal combustion engine; and a control element arranged to control the operation of the fuel supply element to stop fuel supply to some of the cylinders of the internal combustion engine and supply fuel to remaining cylinders while the fuel supply to said some of the cylinders is being stopped, when the desorbing-state detecting element finds that the HC absorbent is in the state ready for desorbing the absorbed HC and the decelerating-state detecting element finds that the internal combustion engine is in the specified decelerating state.

2. The exhaust cleaning-up device for the internal combustion engine for the vehicle according to claim 1, wherein the desorbing-state detecting element includes an HC-absorbent temperature detecting element for detecting the temperature of the HC absorbent, and determines that the HC-absorbent is in the state ready for desorbing the absorbed HC when the HC-absorbent temperature detecting element finds that the temperature of the HC absorbent is within a specified range.

3. The exhaust cleaning-up device for the internal combustion engine for the vehicle according to claim 1, wherein the desorbing-state detecting element includes a time measuring element for measuring the time that has elapsed after start of the internal combustion engine, and determines that the HC absorbent is in the state ready for desorbing the absorbed HC when the time measuring element finds that the time that has elapsed after the start is within a specified range.

4. The exhaust cleaning-up device for the internal combustion engine for the vehicle according to claim 1, further comprising:

an engine temperature detecting element for detecting the temperature of the internal combustion engine, wherein the control element controls the operation of the fuel supply element to stop fuel supply to some of the cylinders of the internal combustion engine and supply fuel to the other cylinders, when the engine temperature detecting element finds that the internal combustion engine is in a specified cold state, the desorbing-state detecting element finds that the HC absorbent is in the state ready for desorbing the absorbed HC, and the decelerating-state detecting element finds that the internal combustion engine is in the specified decelerating state.

5. The exhaust cleaning-up device for the internal combustion engine for the vehicle according to claim 1, wherein the control element supplies fuel such that the air/fuel ratio in said other cylinders becomes a stoichiometric air/fuel ratio.

6. The exhaust cleaning-up device for the internal combustion engine for the vehicle according to claim 1, further comprising:

a throttle opening adjusting element for adjusting a throttle opening of the internal combustion engine, wherein the control element controls the operation of the throttle opening adjusting element to increase the throttle opening, when the desorbing-state detecting element finds that the HC absorbent is in the state ready for desorbing the absorbed HC and the decelerating-state detecting element finds that the internal combustion engine is in the specified decelerating state.

7. The exhaust cleaning-up device for the internal combustion engine for the vehicle according to claim 1, wherein the control element controls the operation of the fuel supply element to stop fuel supply for all the cylinders of the internal combustion engine, when the desorbing-state detecting element no longer finds that the HC absorbent is in the state ready for desorbing the absorbed HC and the decelerating-state detecting element finds that the internal combustion engine is in the specified decelerating state.

8. The exhaust cleaning-up device for the internal combustion engine for the vehicle according to claim 1, wherein the control element controls the operation of the fuel supply element to continue fuel supply to all the cylinders of the internal combustion engine, before the desorbing-state detecting element finds that the HC absorbent is in the state ready for desorbing the absorbed HC, even when the decelerating-state detecting element finds that the internal combustion engine is in the specified decelerating state.

9. The exhaust cleaning-up device for the internal combustion engine for the vehicle according to claim 1, wherein an automatic transmission for variably transmitting drive power of the internal combustion engine to wheels is coupled to an output shaft of the internal combustion engine by means of a hydraulic coupling arranged to be switched between a direct-connected state and a non-direct-connected state by a direct-connecting clutch, the exhaust cleaning-up device further comprising:

a clutch control element for putting the direct-connecting clutch in the non-direct connected state at least when the automatic transmission is in a specified low temperature range; and a clutch-state detecting element for detecting the non-direct connected state of the direct-connecting clutch, wherein the control element controls the operation of the fuel supply element to stop fuel supply to some of the cylinders of the internal combustion engine and supply fuel to the other cylinders, when the non-direct connected state of the direct-connecting clutch is detected by the clutch-state detecting element.

10. The exhaust cleaning-up device for the internal combustion engine for the vehicle according to claim 1, wherein the catalyst is provided in the exhaust system at the downstream of said HC absorbent.

11. The vehicle according to claim 9, wherein the hydraulic coupling is a torque converter.

12. A vehicle, comprising:

the exhaust cleaning-up device for the internal combustion engine for the vehicle according to claim 1;

a transmission that transmits drive power of the internal combustion engine to wheels;

a hydraulic coupling provided between an output shaft of the internal combustion engine and an input shaft of the transmission, the hydraulic coupling being configured to be selectively switched between a direct-connected state and a non-direct-connected state by a direct-connecting clutch;

a clutch control element for putting the direct-connecting clutch in the non-direct connected state at least when the automatic transmission is in a specified low temperature range; and a clutch-state detecting element for detecting the non-direct connected state of the direct-connecting clutch, wherein the control element controls the operation of the fuel supply element to stop fuel supply to some of the cylinders of the internal combustion engine and supply fuel to the other cylinders, when the non-direct connected state of the direct-connecting clutch is detected by the clutch-state detecting element.

13. The vehicle according to claim 12, wherein the transmission is an automatic transmission.

14. The vehicle according to claim 12, wherein the hydraulic coupling is a torque converter.

* * * * *